Jan. 18, 1966 L. CANN 3,230,447

MAGNETIC PLATING MONITORING DEVICE

Filed Nov. 1, 1961

United States Patent Office 3,230,447

Patented Jan. 18, 1966

3,230,447

MAGNETIC PLATING MONITORING DEVICE

Leopold Cann, Woodland Hills, Calif., assignor, by mesne assignments, to The Bunker-Ramo Corporation, Stamford, Conn., a corporation of Delaware Filed Nov. 1, 1961, Ser. No. 149,335

10 Claims. (Cl. 324—34)

The present invention relates to electroless plating processes, and more particularly to a device for monitoring the magnetic qualities of an electrolessly plated material.

The plating of magnetic material by electroless processes is well known in the prior art, and is accomplished by autocatalytic chemical action. In such processes, an alloy of a metal such as cobalt or nickel is usually deposited on a suitable base member, the latter being immersed in a reducing solution containing salts of the metal or metals to be plated. During such immersion, the metal salts are reduced (usually by a hypophosphite reducing agent), and a metal deposit containing a small amount of phosphorus is plated on the surface of the base member, the latter serving to catalyze the reaction.

The metal deposits formed are therefore metallic phosphides, and provide a uniform coating on all surfaces of the base member being plated. If properly prepared, the coating will be uniform on both interior and exterior surfaces, and along edges and at irregular surfaces of the base member.

It will be obvious that electroless plating processes have possible use in the production of components for electrical and electronic equipment. As will be apparent, such components must have certain desired magnetic properties, depending upon their use. Thus, for example, a coating for a particular purpose must exhibit a predetermined level of magnetic signal. However, when electroless plating methods have been employed in the prior art for the production of coatings for electronic components, the obtaining of optimum magnetic signal levels has proved extremely difficult. It has usually been necessary to depend upon the chemical process conditions for assuring a particular level of magnetic signal. Furthermore, the magnetic signal level actually attained has heretofore been measurable only after the process has been completed, and the magnetic coating formed.

It is therefore an object of the present invention to provide a device which will facilitate the attainment of an optimum magnetic signal level in an electrolessly plated magnetic material.

Another object of the invention is to provide a device enabling control of an electroless plating process without reliance on the chemical reaction conditions.

Another object of the invention is to provide a device for the continuous monitoring of the magnetic qualities of a magnetic material during the electroless plating thereof.

Figure 1:
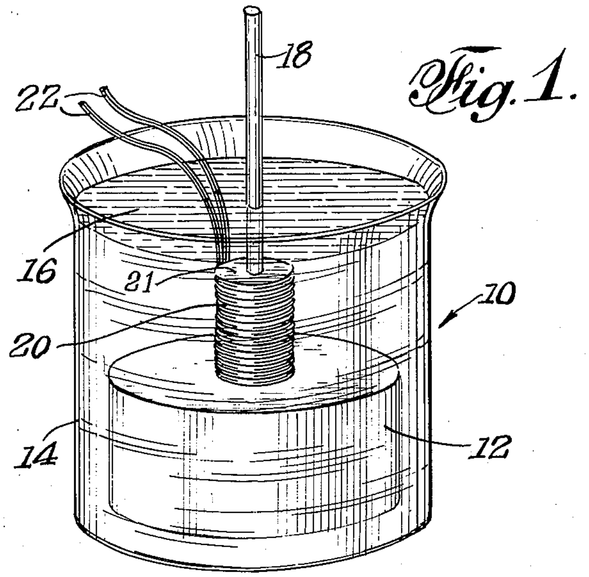
Figure 2:
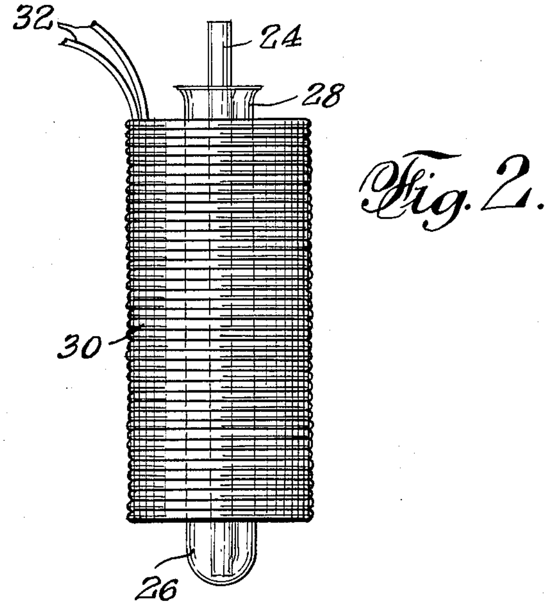

These and other objects of the invention will become more apparent from the following description thereof, read in conjunction with the accompanying drawings, in which:

FIGURE 1 is a somewhat diagrammatic perspective of a device constructed in accordance with the invention, said device being shown in position for use during the electroless plating of a memory drum; and FIGURE 2 is a front elevation of a modified form of the invention.

Referring to the drawings, and particularly to FIGURE 1, apparatus 10 is shown for the electroless plating of a magnetic material on a base member such as a memory drum 12. The apparatus 10 includes a beaker 14 of conventional structure, which contains an electroless bath 16 of any conventional type. The memory drum 12 is provided with a test element in the form of a handle 18, and said drum 12 is supported above the bottom of the beaker 14, with the handle 18 secured thereto and extending upwardly therefrom.

Mounted on the handle 18 is a B-H loop tracer coil 20 of conventional design, the latter also being immersed in the bath 16. The coil 20 may, for example, consist of 4500 turns of #18 copper wire, and be coiled about a conventional hollow former, of one inch diameter 21. The coil 20 is insulated in order to withstand corrosion due to the alkaline characteristics of the hypophosphite bath 16, and also to withstand the temperature of the latter. Said coil 20 is for this purpose encased in a conventional coating, such as of epoxy resin, adapted to provide the necessary resistance.

The coil 20 terminates in two leads 22, which extend outwardly from the beaker 14, and are connected in circuit with a conventional oscilloscope (not shown) and with a suitable source of electric current.

It will be realized that the handle 18 has been subjected to the same conventional operations preparatory to electroless plating as the drum 12 (cleaning, activating, etc.). Being of a material similar to that of the drum 12, the handle 18 will thus provide a catalytic surface for the plating of magnetic material thereon from the bath 16, and the material so plated at any given moment will have the same magnetic qualities as that plated on the drum 12 itself.

Upon application of a suitable electric drive to the B-H coil 20, a continuous visual picture of the hysteresis loop of the magnetic material being deposited on the handle 18 is provided by the oscilloscope. Since the hysteresis loop characteristic of the magnetic material being deposited on the drum 12 is the same as that of the material deposited on the handle 18, a means of control is thus afforded, whereby the plating process can be terminated when an optimum magnetic signal level has been obtained.

It has been found desirable to remove the B-H coil 20 from the handle 18 periodically during the plating process, and to immerse said coil 20 in a suitable conventional low-temperature bath (not shown) for cooling thereof.

Instead of the single drum 12, several components might be simultaneously plated in the bath 16, and the magnetic characteristics thereof tested in the manner described, provided adequate agitation of the bath 16 is maintained.

Referring to FIGURE 2, a modified form of the invention is shown. Here, a test element or bar 24, constructed of the same material as a base member (such as, e.g., the memory drum 12) being plated, is immersed in a sample portion 26 of the same electroless bath as employed for plating said base member, the sample portion 26 being contained in a test tube 28. Here again, a B-H coil 30 is utilized, similar to the coil 20. The B-H coil 30, however, is mounted by any conventional means (not shown) about the test tube 28, and is connected by leads 32 in circuit with an oscilloscope (not shown) and an electric current source. Thus, upon application of a suitable drive to the B-H coil 30, a continuous visual picture of the hysteresis loop of the magnetic material plated on the test bar 24 will be obtained. If the plating of the test bar 24 is carried on simultaneously with that of the base member, the hysteresis loop will provide an indication of the point at which an optimum magnetic signal level for the base member is obtained.

The invention having thus been described, it will be realized that various changes and modifications may be made therein without departing from the spirit of the invention or the scope of the appended claims.

Having thus described the invention, what is claimed and desired to be secured by Letters Patent is:

1. A device for monitoring the magnetic qualities of a magnetic material plated from an electroless bath on the surface of a base member during the plating process, comprising a test element of the same material and having a surface prepared for plating in the same fashion as the base member, an arrangement for immersing the test element in a bath having the same composition as the electroless bath, and a B-H loop tracer coil positioned so as to encompass the test element in a magnetic field originating in the tracer coil, the coil including insulating means for protection from said electroless bath, in order that the coil may be energized in conjunction with an oscilloscope upon application of an electric drive to indicate the hysteresis loop characteristic of a magnetic coating being plated on said test element.

2. A device for monitoring the magnetic qualities of a magnetic material being plated from an electroless bath on the surface of a base member, comprising a base member to be plated with a magnetic coating and having a handle extending therefrom to form a test element, an arrangement for immersing the base member and the test element in an electroless plating bath, and a B-H loop tracer coil wound about said test element, said coil including insulating means for protection from said electroless bath, so that the coil may be energized in conjunction with an oscilloscope to indicate upon application of an electric drive the hysteresis loop characteristic of a magnetic coating being plated on said test element.

3. A device for monitoring the magnetic qualities of a magnetic material being plated from an electroless bath on the surface of a base member, comprising a test element of the same material and having a surface prepared in the same fashion as a base member, an arrangement for immersing the test element in a liquid separate from and having the same composition as the electroless bath in which the base member is being plated concurrently, and a B-H loop tracer coil wound about said test element, said coil including a pair of electrical leads for connection in conjunction with an oscilloscope upon application of an electric drive to indicate the hysteresis loop characteristic of a magnetic coating on said test element.

4. An arrangement for monitoring the magnetic properties of a magnetic material being plated from an electroless bath on the surface of a base member comprising a test element of the same material and having a surface prepared in the same fashion as the base member, a container for immersing the test element in an electroless plating bath for plating the test element concurrently with the base member and under the same conditions, and a B-H loop tracer coil arranged for generating a magnetic field in response to an applied voltage and positioned to encompass the test element in said magnetic field in order that the hysteresis loop characteristic of the magnetic coating being plated on the test element may be detected as an indication of the extent of the plating on the base member.

5. An arrangement in acordance with claim 4 wherein said tracer coil comprises a conducting winding wound about a hollow former mounted on the test element, the coil including an epoxy resin coating over said winding and said former to resist the chemical action of the electroless bath.

6. An arrangement for monitoring the magnetic properties of a magnetic material being plated from an electroless bath on the surface of a base member comprising a test element of the same material and having a surface prepared in the same fashion as the base member, a container for immersing the test element in an electroless plating bath for plating the test element concurrently with the base member and under the same conditions, and a B-H loop tracer coil arranged for generating a magnetic field in response to an applied voltage and removably positioned about the test element in order that the hysteresis loop characteristic of the magnetic coating being plated on the test element may be detected as an indication of the extent of the plating on the base member.

7. An arrangement in accordance with claim 6 wherein the test element is affixed as an integral part of the base member.

8. An arrangement in accordance with claim 7 wherein the base member comprises a memory drum and the test element comprises a handle affixed to said memory drum.

9. An arrangement for monitoring the magnetic properties of a magnetic material being plated from an electroless bath on the surface of a base member comprising a test element separate from the base member of the same material and having a surface prepared in the same fashion as the base member, a container for immersing the test element in an electroless plating bath for plating the test element concurrently with the base member and under the same conditions, said container including a liquid separate from the plating bath for the base member but of the same composition as said plating bath, and a B-H loop tracer coil arranged for generating a magnetic field in response to an applied voltage and removably positioned about the test element in order that the hysteresis loop characteristic of the magnetic coating being plated on the test element may be detected as an indication of the extent of the plating on the base member.

10. An arrangement for monitoring the magnetic properties of a magnetic material being plated from an electroless bath on the surface of a base member comprising a test element separate from the base member of the same material and having a surface prepared in the same fashion as the base member, a container for immersing the test element in an electroless plating bath for plating the test element concurrently with the base member and under the same conditions, said container including a liquid separate from the plating bath for the base member but of the same composition as said plating bath, and a B-H loop tracer coil arranged for generating a magnetic field in response to an applied voltage and positioned to encircle both the test element and the container in order that the hysteresis loop characteristic of the magtic coating being plated on the test element may be detected as an indication of the extent of the plating on the base member.

References Cited by the Examiner

UNITED STATES PATENTS

| | | | |
|---|---|---|---|
| 1,559,085 | 10/1925 | Gokhale | 324—34 |
| 2,217,843 | 10/1940 | Langer | 324—40 |
| 3,040,246 | 6/1962 | Ludin | 324—34 |

FOREIGN PATENTS

| | | |
|---|---|---|
| 825,288 | 11/1937 | France. |

RICHARD B. WILKINSON, *Primary Examiner.*

WALTER L. CARLSON, *Examiner.*